May 7, 1946.  A. E. HARRISON  2,399,674
ALTERNATING CURRENT POWER BRIDGE
Filed Nov. 11, 1943
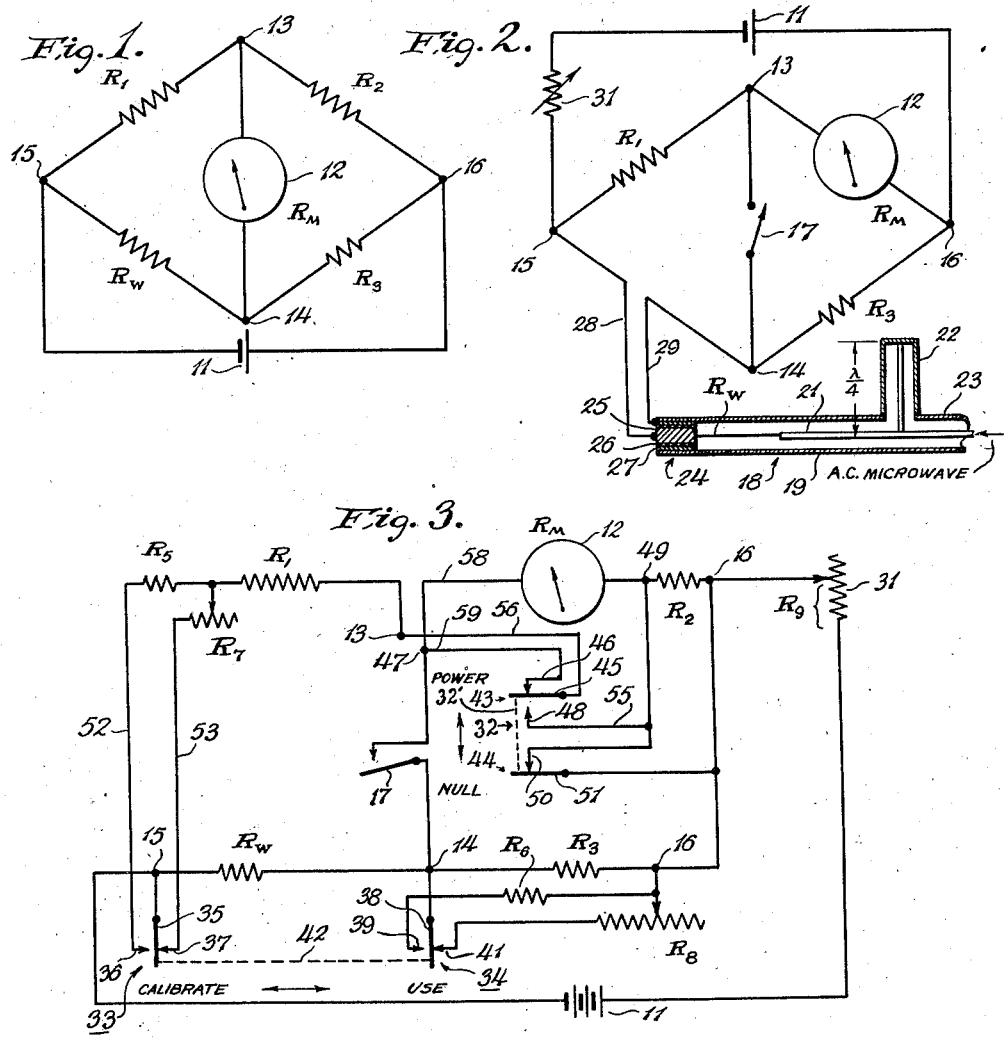
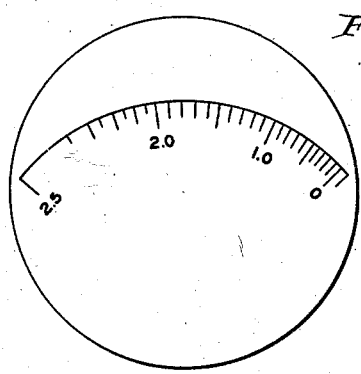
Fig. 4.
INVENTOR
ARTHUR E. HARRISON
BY
ATTORNEY Patented May 7, 1946

2,399,674

UNITED STATES PATENT OFFICE 2,399,674

ALTERNATING CURRENT POWER BRIDGE

Arthur E. Harrison, Rockville Centre, N. Y., assignor to Sperry Gyroscope Company, Inc., a corporation of New York Application November 11, 1943, Serial No. 509,889

11 Claims. (Cl. 171—95)

The present invention relates to power measurement and has for its principal object the provision of improved methods and apparatus for measuring power, particularly at high frequencies.

An object of the invention is to provide a balanced bridge wattmeter requiring only one deflecting instrument and having a relatively small direct-current power input, consuming only about one-fourth the direct current power usually consumed in an alternating-current power bridge.

Another object is to provide a power bridge in which simplified rectifier and filter arrangements may be employed or which may be energized by a storage battery or dry cells.

Still another object is to provide a bridge in which no galvanometer is required as a null indicator.

Still another object is to provide a power bridge having a hot wire element, the resistance of which is maintained constant to maintain voltage and amperage proportional.

An object of the invention is to provide a direct reading radio frequency wattmeter which is sensitive to small changes of large powers and which has a calibration curve represented by the formula $1-x^2$.

Another object is to provide a bridge which is adjustable for employing hot wire elements of different resistances.

Still another object of the invention is to provide a bridge employing only one deflecting instrument and in which dipping of the instrument pointer is avoided.

Still another object of the invention is to provide a power bridge having a constant standing wave ratio regardless of the magnitude of the power, but which has a relatively simple circuit.

Still another object of the invention is to provide a power bridge in which direct-current power consumption is reduced by making resistances of the bridge unsymmetrical and dissipating most of the power in one arm of the bridge.

Still another object of the present invention is to provide a power bridge in which balance may be ascertained by closing or opening the diagonal arm without utilizing a null galvanometer.

Other and further objects and advantages will become apparent as the description proceeds.

In carrying out the invention in its preferred form, a hot wire element is employed which carries alternating current, the power of which is to be measured. Means are provided for supplying the hot wire with direct current power, for ascertaining the direct current power consumption when alternating current power is applied and when alternating current power is absent, and for maintaining the total power dissipation constant in order that the difference in the two values of direct current power will represent the alternating current power measured. In order to maintain the power dissipation constant, means are provided for measuring the resistance of the hot wire and holding it at a constant value. To this end, the hot wire is made one arm of a resistance bridge.

In order to maintain the power consumption of the bridge at a minimum, one or more arms of the bridge are made very small in resistance, and a milliammeter serving as a power indicating instrument is made one arm of the bridge. In order to eliminate the need for a null indication galvanometer, a switch is connected with the diagonal arm of the bridge and is arranged to be opened or closed to indicate presence or absence of bridge balance by absence or presence of variation in the reading of the milliammeter serving as one arm of the bridge.

A better understanding of the invention will be afforded by the following detailed description, considered in connection with the accompanying drawing, in which Fig. 1 is a circuit diagram of a balanced power-measuring bridge;

Fig. 2 is a circuit diagram of the bridge with a milliammeter shown as one arm of the bridge and a hot wire alternating current power-absorbing element schematically represented as another arm of the bridge;

Fig. 3 is a more detailed circuit diagram showing an arrangement for alternatively calibrating the bridge or connecting it for measurement of power; and Fig. 4 is a diagram illustrating the scale distribution which may be obtained in deflecting the current instrument serving as a power indicator in the apparatus of Figs. 2 and 3.

Like reference characters are utilized throughout the drawing to designate like parts.

Balanced bridges have been proposed for measuring alternating current power in which one arm of the bridge receives both direct current power from a source energizing the bridge and alternating current power from the source to be measured. Any variations in alternating current power are ascertained by measuring the variations in direct current power required to balance the bridge.

Ordinarily, the four bridge arms are made equal in resistance so as to produce what is called a "symmetrical bridge." With equal resistances the same power is consumed in each bridge arm, and the total direct power consumed must be four times that required to be consumed in the hot wire.

I have found that balance of such a bridge can be measured with a far greater degree of accuracy than the direct current power input. Consequently, the accuracy of the reading obtained is by no means commensurate with the apparent accuracy of the indication of balance. I have found that the direct current power consumption may be reduced to little more than one-fourth that of a symmetrical power bridge by making the bridge unsymmetrical, thereby reducing the unnecessarily great sensitivity of the balance indication.

For example, referring to Fig. 1, the bridge may comprise three unequal bridge arms $R_1$, $R_2$, $R_3$ and a fourth bridge arm $R_w$ representing the direct current resistance of a hot wire adapted to receive high frequency alternating current power. For energizing the bridge with direct current, a suitable source 11, schematically represented as a battery of dry cells, is provided. As shown in Fig. 1, the conventional diagonal arm consists of a deflecting instrument which may be a milliammeter 12 having a resistance $R_m$ connected between two conjugate points 13 and 14 of the bridge. The remaining two conjugate points 15 and 16 of the bridge are connected to the direct current power source 11.

For the sake of conserving direct current power, the resistance ratio $R_1/R_w$ is made large and the ratio $R_w/R_3$ is also made large. Sufficient null sensitivity is obtained if the resistance of the arm $R_2$ is very large in comparison with the resistance $R_m$ of the instrument 12.

For avoiding the necessity of separate instruments for indicating balance and measuring direct current input, the instrument 12 may be connected in place of the bridge arm $R_2$. This is illustrated in Fig. 2. For indicating bridge balance, a switch 17 is connected between the conjugate points 13 and 14 of the bridge. As shown, the hot wire arm $R_w$ of the bridge is so mounted as to absorb radio frequency power supplied thereto through a concentric line unit 18.

The unit 18 comprises an outer metallic cylinder 19, an inner conductor 21, a continuation of which is formed by the hot wire $R_w$ and a quarter-wave stub 22, permitting a direct current circuit to be made through the wire $R_w$ without upsetting the standing wave relationships in the concentric line unit 18. A suitable coupling (not shown) is provided for supplying microwave alternating current power at the right-hand end 23 of the concentric line 18 (shown broken away). For short-circuiting the left-hand end 24 of the line 18 with respect to alternating current but insulating the inner and outer conductors with regard to direct current, a cylindrical condenser is formed at the left-hand end 24, comprising a conducting cylinder 25 surrounded by an insulating tube 26, which is surrounded in turn by a metallic sleeve 27 making contact with the inner surface of the hollow cylinder 19. Direct current connections are made through conductors 28 and 29 to the conducting elements 25 and 27, respectively.

In Fig. 2 as in Fig. 1, the resistance ratios $R_1/R_w$ and $R_w/R_3$ are large, of the order of 100:1, for example. Furthermore, the resistance $R_m$, though small, is large in relation to the negligible resistances between the points 13 and 14 when switch 17 is closed.

When the bridge of Fig. 2 is balanced, no current tends to flow through the diagonal arm, and the reading of the milliammeter 12 is unaffected by opening or closing the switch 17. A balanced condition of the bridge is therefore indicated by absence of variation in instrument reading when the switch 17 is opened and closed.

The balance indication sensitivity is equivalent to the accuracy of the same instrument. In addition, there is no uncertainty in regard to the null, and parallax would not affect the condition of balance, since balance is indicated by no deviation from the previous position of the instrument pointer.

For adjusting the magnitude of the direct current input to the bridge for the purpose of balancing the bridge, a rheostat 31 is provided.

The power measurement is made by first adjusting the rheostat 31 to obtain balance when no alternating current is supplied to the concentric line unit 18, reading the instrument 12, and then balancing the bridge again when the alternating current to be measured is supplied to the concentric line element 18 so as to be dissipated in the hot wire $R_w$. Since the direct current power supplied to the bridge is proportional to the square of the current flowing in any part of the bridge, the resistances being maintained constant, the instrument 12 may be calibrated in terms of power. Preferably, the apparatus is so arranged that a maximum current reading or minimum power reading, as shown by the scale represented in Fig. 4, is obtained when direct current power only is supplied to the hot wire element $R_w$.

Since the resistance of the hot wire element $R_w$ depends upon its temperature, which in turn depends upon the power consumed in it, the maintenance of constant resistance by maintaining bridge balance assures the constancy of the power consumption in the element $R_w$ whether the power is supplied partially or wholly by direct current.

The bridge may be arranged for being balanced either by the short-circuit method or the customary diagonal galvanometer method, and, furthermore, calibrating means may be provided for enabling the bridge to be used with hot wire units of different resistances as illustrated in Fig. 3.

In the arrangement of Fig. 3 a change-over switch 32 is provided, having an upper position for utilizing the instrument 12 to measure power and a lower position for utilizing the instrument 12 to indicate the null condition.

Furthermore, a pair of ganged switches 33 and 34 is provided for alternatively connecting the apparatus for calibration, which is the left-hand position, and use, which is the right-hand position.

To facilitate calibration, a resistance $R_5$ is provided which is adapted to be connected in series with the bridge arm $R_1$. A resistor $R_6$ is provided which is adapted to be connected in parallel with the bridge arm $R_3$. A rheostat $R_7$ is privided which is adapted alternatively to be connected in series with the bridge arm $R_1$, and a rheostat $R_8$ is provided which is adapted to be connected in place of the resistor $R_6$.

The calibration switch 33 includes a movable blade 35 connected to the bridge point 15, and a pair of stationary contacts 36 and 37 connected respectively to the resistors $R_6$ and $R_7$, the remaining ends of the resistors $R_6$ and $R_7$ being connected to the bridge arm $R_1$. Likewise, the calibration switch 34 comprises a movable blade 38 connected to the bridge point 14 and a pair of stationary contacts 39 and 41 connected to the ends of the resistors $R_8$ and $R_8$, respectively, the remaining ends of which are connected to the bridge point 16 common to the bridge arms $R_3$ and $R_2$.

A suitable mechanical connection represented by the dotted line 42 is provided for causing simultaneous operation of the calibrator switch blades 33 and 34.

The change-over switch 32 comprises a single-pole, double throw element 43 and a single-pole single throw element 44 ganged together as represented by dotted line 32'. The element 43 has a movable blade 45 connected to the bridge point 13 at right-hand end of the resistor $R_1$, an upper stationary contact 46 connected to a left-hand instrument terminal 47, and a lower stationary contact 48 connected to a terminal 49 common to the instrument 12 and the resistor $R_2$.

The element 44 has a stationary contact 50 connected to the terminal 49 and a movable blade 51 connected to the bridge point 16.

When the calibration switches 33 and 34 are moved to the left-hand or calibration position, circuits are closed from the bridge point 15 through the switch elements 35 and 36, a conductor 52 and the resistor $R_5$ to the bridge arm $R_1$, and likewise from the bridge point 14, through the switch elements 38 and 39, and the resistor $R_6$ to the bridge point 16, placing the resistor $R_6$ in shunt with the resistor $R_3$. On the other hand, when the calibration switches 33 and 34 are moved to the right or use position, circuits are completed from the bridge point 15 through the switch elements 35 and 37, a conductor 53, and the rheostat 57 to the bridge arm $R_1$, thus placing the rheostat $R_7$ instead of the resistor $R_5$ in series with the resistor $R_1$. Likewise, a circuit is completed from the bridge point 14, through the switch elements 38 and 41, through the rheostat $R_8$ to the bridge point 16, placing the rheostat $R_8$ instead of the resistor $R_6$ in parallel with the bridge arm $R_3$.

When the change-over switch 32 is in the lower or null indicating position, the bridge arm $R_2$ is connected between the bridge points 16 and 13 and in series with the resistor $R_1$ through the terminal 49, a conductor 54, conductor 55, switch elements 48 and 45, and a conductor 56 to the bridge point 13 and the resistor $R_1$. Likewise, a diagonal arm circuit is completed from the terminal 49 through the instrument 12, a conductor 58 and the switch 17 to the conjugate point 14. On the other hand, when the change-over switch 32 is moved to the normal upper or power measuring position, the contacts 50 and 51 are closed, short-circuiting the resistor $R_2$ and substituting the instrument 12 for the resistor $R_2$ in a circuit from the bridge point 16, the switch contacts 50 and 51, the conductor 54, the instrument 12, the conductors 58 and 59, the switch contacts 46 and 45, and the conductor 56 to the bridge point 13 and the resistor $R_1$. The diagonal arm of the bridge is then the switch 17 between the points 13 and 14.

It will be understood that the balance-testing switch 17 is closed when balance is to be tested by means of the instrument 12, and the switch 32 is in the null position.

Several power ranges may be combined in a single unit with a selector switch connected to different resistors in the bridge, but for the sake of simplicity, the multi-bridge feature has been deleted in the circuit of Fig. 3. The operating procedure and the calibrating adjustments are as follows:

(1) With switch 33—34 in the "calibrate" position, increase the D. C. input by means of the rheostat 31 until the rated value is reached. This is the value at which the instrument 12 reads 0 on the scale of Fig. 4. Resistors $R_5$ and $R_6$ are chosen so that the combination with $R_1$ and $R_3$ will balance the bridge if the hot wire resistance $R_w$ is the rated value at the rated power input. The meter should read full scale (zero power) with switch 17 open or closed. If the hot wire resistance differs slightly from the rated value at the rated power input, the bridge will not be balanced. In this case, adjust the D. C. power input until the readings with switch 17 open and closed are equally spaced from the full scale (zero power) position. The power input for this adjustment will be rated power if the deviation from full scale reading is not too great.

(2) Without changing the power input, return switch 33—34 to the "use" position, close the switch 17 and adjust $R_8$ until the meter reads full scale (zero power). Open switch 17 and adjust $R_7$ until the meter again reads full scale. The bridge is now balanced and the power reading is zero.

(3) Apply the R. F. power. If the R. F. power is known to be large, reduce the D. C. input first to avoid danger of burning out the hot wire. Maximize the power input. This can be determined by observing the effect on the meter reading. The D. C. current will decrease, i. e., the R. F. power reading will increase as the R. F. power increases the resistance of the hot wire (4) Open switch 17 intermittently while adjusting the D. C. power input until the meter pointer is motionless when the switch is opened. Make any final adjustments of R. F. matching, etc., repeating the balance adjustment if necessary. The R. F. power is then read directly on the meter scale.

(5) If a null indication is desired, switch 32 should be changed from the "power" position to the "null" position. After the R. F. adjustments have been made, and the D. C. power reduced to give a null indication, switch 32 is returned to the power position and the meter scale will read the value of the R. F. power.

(6) Any failure to obtain a bridge balance at "zero power" when there is no R. F. in the wire indicates that the adjusting resistors $R_7$ and $R_8$ have been changed, or that the resistance of the hot wire is changing due to aging. This should be checked by repeating procedures (1) and (2).

The provision of the resistors $R_7$ and $R_8$ permits retaining the direct-reading feature and having the bridge balanced even though hot-wire elements of precisely the same resistance are not always available.

In accordance with the provisions of the patent statutes, the principle of the operation of the invention has been described together with the apparatus now believed to represent the best embodiment thereof, but it is to be understood that the apparatus shown and described is only illustrative and that the invention may be carried out by other arrangements.

What is claimed is:

1. A low-power-consumption bridge, which comprises first, second and third bridge resistors, a hot wire element connected in series-parallel with said resistors to form a Wheatstone bridge circuit, and a galvanometer, the first and second resistors being connected in series, and the hot wire element and the third resistor being connected in series, the first resistor and the hot wire element having a common terminal, and the second and third resistors having a common terminal, the galvanometer being connected as a diagonal arm across said second and third resistors, the resistance of the first resistor being high in relation to the hot wire element, and the resistance of the hot wire element being high in relation to the resistance of the third resistor, the resistance ratio of the first and second resistors being equal to the resistance ratio of the hot wire element and the third resistor to give bridge balance, and the resistance of the second resistor being high in relation to the resistance of the diagonal arm galvanometer.

2. A power measuring bridge for alternating current, comprising a hot wire element, a first resistor, a current-responsive instrument having an internal resistance serving as a second resistor, a third resistor, and a switch, the three resistors and the hot wire element being connected in series-parallel to form a bridge, the first resistor and the instrument having a common terminal serving as one conjugate bridge point, the hot wire element and the third resistor having a common terminal serving as a second conjugate bridge point, the switch being connected between said conjugate bridge points for indicating balance of the bridge by an absence of variation in deflection of the instrument, the resistance of the first resistor being high in relation to the resistance of the hot wire element, the resistance of the hot wire element being high in relation to the resistance of the third resistor, and the resistance of the instrument being relatively high in relation to the resistance between said conjugate bridge points when said switch is closed.

3. A power measuring bridge for alternating current, comprising a hot wire element, a first resistor, a current-responsive instrument having an internal resistance serving as a second resistor, a third resistor, and a switch, the three resistors and the hot wire element being connected in series-parallel to form a bridge, the first resistor and the instrument having a common terminal serving as one conjugate bridge point, the hot wire element and the third resistor having a common terminal serving as a second conjugate bridge point, the switch being connected between said conjugate bridge points for indicating balance of the bridge by an absence of variation in the deflection of the instrument.

4. A power measuring bridge for alternating current, comprising a hot wire element, a first resistor, a second resistor means, and a third resistor, the three resistors and the hot wire element being connected in series-parallel to form a bridge, the first resistor and the second resistor means having a common terminal serving as one conjugate bridge point, the hot wire element and the third resistor having a common terminal serving as a second conjugate bridge point, a calibrating resistor and an operating rheostat adapted to be connected alternatively in series with the first resistor, a second calibrating resistor and a second operating rheostat adapted to be connected alternatively in parallel with said third resistor, and a switch having calibration and use positions with contacts for connecting said calibration resistors in the calibration position of the switch and connecting the operating rheostats in the use position of the switch.

5. A power measuring bridge for alternating current, comprising a hot wire element, a first resistor, a second resistor, a current-responsive instrument having an internal resistance serving as a resistor, and a third resistor, the three resistors and the hot wire element being adapted to be connected in series-parallel to form a bridge, but the first and third resistor, the hot wire element and the instrument normally being in series-parallel, the first resistor and the instrument having a common terminal serving as one conjugate bridge point, the hot wire element and the third resistor having a common terminal serving as a second conjugate bridge point, a test switch being connected between said conjugate bridge points for indicating balance of the bridge by an absence of variation in deflection of the instrument, a change-over switch, said change-over switch having contacts for alternatively connecting the second resistor in place of the instrument and connecting the instrument in series with said test switch between the conjugate bridge points for null indications.

6. An alternating current power measuring bridge comprising four resistance elements connected in series-parallel, one of said elements being a hot wire element adapted to absorb alternating current power, one of said elements being a deflecting instrument, and the resistance ratio of said hot wire element to an adjacent element being high.

7. A resistance-responsive bridge circuit, comprising four resistance elements connected in series-parallel, each series pair having a common terminal serving as a conjugate bridge terminal, and a switch connected between said bridge terminals, one of said bridge arms including a current-responsive instrument whereby balance is indicated on opening and closing said switch by constancy of instrument indication.

8. An alternating-current power measuring bridge, comprising a plurality of resistance elements connected in series-parallel, with one of said elements being a hot wire element adapted to absorb alternating current power, the resistance ratios of said elements being such as to cause a preponderant proportion of the energy to be absorbed in the hot wire element.

9. An alternating current power measuring bridge comprising a hot wire element and three resistance elements connected in series-parallel to form a bridge circuit, the resistance of one element adjacent said hot wire element being greater than the resistance of said hot wire element and the resistance of the other element adjacent said hot wire element being smaller than the resistance of said hot wire element in a manner such that a major portion of the energy supplied to said bridge circuit is dissipated by said hot wire element.

10. An alternating current power measuring bridge, comprising a hot wire element and three resistance elements connected in series-parallel to form a bridge circuit having two conjugate terminals for connection to a potential source, the resistance of the one of said resistance elements connected to said hot wire element at one of said conjugate terminals being greater than the resistance of said hot wire element, and the resistance of the other element connected to said hot wire element being smaller than the resistance of said hot wire element, whereby a major portion of the energy supplied to said bridge circuit by said potential source is dissipated by said hot wire element.

11. An alternating current power measuring bridge comprising a hot wire element and three resistance elements connected in series-parallel to form a bridge circuit, the resistance of one element adjacent said hot wire element being greater than the resistance of said hot wire element and the resistance of the other element adjacent said hot wire element being smaller than the resistance of said hot wire element.

ARTHUR E. HARRISON.